United States Patent [19]

Lang

[11] 4,390,158

[45] Jun. 28, 1983

[54] ELECTRO HYDRAULIC SERVO VALVE

[75] Inventor: Armin Lang, Schwaebisch Gmuend, Fed. Rep. of Germany

[73] Assignee: Zahnradfabrik Friedrichshafen, AG., Friedrichshafen, Fed. Rep. of Germany

[21] Appl. No.: 196,827

[22] Filed: Oct. 14, 1980

[30] Foreign Application Priority Data

Oct. 24, 1979 [DE] Fed. Rep. of Germany ....... 2942886

[51] Int. Cl.$^3$ ........................................... F16K 31/06
[52] U.S. Cl. .................................. 251/129; 251/141; 251/282
[58] Field of Search ................. 251/282, 129; 137/495

[56] References Cited

U.S. PATENT DOCUMENTS

| 2,853,659 | 9/1958 | Herion | 251/141 X |
| 3,202,182 | 8/1965 | Haviland | 251/282 X |
| 3,325,139 | 6/1967 | Diener et al. | 251/129 |
| 3,534,770 | 10/1970 | Kowalski | 251/282 X |
| 3,805,203 | 4/1974 | Deckard | 251/129 X |
| 4,074,700 | 2/1978 | Engle | 251/282 X |

FOREIGN PATENT DOCUMENTS

| 1025692 | 3/1958 | Fed. Rep. of Germany | 251/282 |
| 2347559 | 3/1975 | Fed. Rep. of Germany | 251/129 |
| 2618874 | 11/1977 | Fed. Rep. of Germany | |

*Primary Examiner*—Arnold Rosenthal
*Attorney, Agent, or Firm*—Zalkind & Shuster

[57] ABSTRACT

A solenoid operated valve is provided particularly constructed to decrease friction in the course of operation and thus of the hysteresis or actuating lag effect. The general construction utilizes a solenoid acting to maintain closure of a valve by pulling on an armature to which is integrally secured a valve operating element having a valve head at one end and which passes through the core on which the solenoid is mounted. The armature has a piston formation extending into a pressure chamber of the housing. Pressure in the outlet of the valve communicates with the pressure chamber to maintain a net closing effect on the valve. Accordingly, pressures at the valve are prevented from acting against the energized solenoid.

5 Claims, 1 Drawing Figure

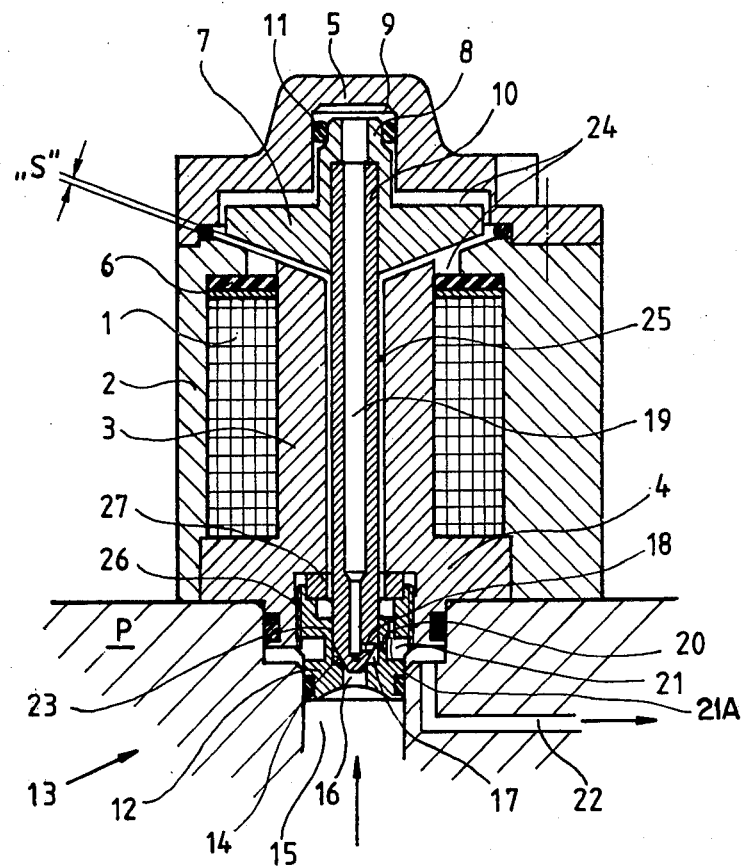

ELECTRO HYDRAULIC SERVO VALVE

BRIEF DESCRIPTION

German Pat. No. 2,618,874 shows a valve of the type disclosed herein.

The solenoid is carried between an iron core and an iron housing wherein flanges of such members lock the solenoid in place at its radial ends. The core passes through the solenoid and has a bore through which the operating element, in effect an elongated valve stem having a central bore passes. The valve stem at one end is integrally secured to an armature spaced by an air gap from the core and a flux carrying face of the housing. At the other end a valve head is formed. In particular, the armature has a piston formation which extends into a feedback pressure chamber provided in the housing cover. The construction utilizes a single guide bearing engagement for the armature, the piston and the operating element at the armature end. Provision of such guide bearing in the pressure chamber, and another within the housing at a considerable distance from the first bearing has an advantage in maintaining to a small degree any skewing or tilting forces which may be experienced by the moving elements. An O-ring within the pressure chamber intermediate the walls of the chamber and the piston effects the first guide bearing, among other functions, and a long spacing of the guide bearing at the valve end of the elongated operating member closely adjacent a valve seat provides two bearings for the moving elements that minimize skewing friction by effecting proper axial movement of the operating element or valve stem. Accordingly, only a small hysteresis, that is, lagging response to motion is effected.

A particular arrangement of conical shaping of adjacent surfaces of the armature and the magnetic poles of the solenoid effects a better utilization of the materials by providing a larger flux transmittal surface. The magnetic housing and the magnetic solenoid core have L-shaped cross sections whereby the armature may be made of smaller diameter resulting in a lesser force tending to cause tilting to aid in minimizing friction, and thus a lagging action. Further, by the use of conical coacting flux carrying surfaces the cross section of magnetic field lines is uniform as well as shorter in the area of the solenoid magnetic poles. This minimizes losses and improves the effectiveness of operation.

DETAILED DESCRIPTION

The drawing shows a longitudinal cross section of the essential components of the invention wherein a solenoid 1 is carried in a chamber effected by a housing 2 and a core 3. The housing and core effect the poles of the solenoid and are of magnetic material. The housing 1 is L-shaped in the sense shown in the cross sectional view wherein an inturned radial flange effects the L-shape. The core 3 is likewise L-shaped in the sense shown in the drawing in that an outwardly extending radial flange 4 effects such L-shape. A cover 5 is part of the housing and closes it, as shown at one end.

Assembly involves the ends of the solenoid being supported against the inner radial faces of the flanges, as shown, the solenoid being placed on the core and the housing, with gasket 6, telescoped over the solenoid. Gasket 6 seals the solenoid from a flow return channel 25 within the bore provided in the core. The channel 25 encompasses the valve operating element 10 and communicates with a valve outlet 22 via passages shown. The entire construction is supported on a base plate P.

An armature 7 is integrally secured to an end of operating element 10, which element is nonmagnetic. The surface of the armature facing the magnetic poles of the solenoid which are effected by the housing flanges and the core hub, is conical. The poles share a common conicality complementary to that of the armature and spaced therefrom by the air gap S.

A piston 8 is provided as a formation extending from the armature 7 into a feedback pressure chamber 9 within the housing cover 5. A gasket, such as an O-ring 11, surrounds the piston 8 within the chamber and serves as a guide bearing. Such O-ring also seals the chamber 9 from chamber 24 which houses the armature 7, and also functions in the manner of a diaphragm by absorption of movement of armature 7 and the integral operating element 10. Such a mounting arrangement operates with very little friction. Additionally, the gasket 11 can serve for pressure relief against high return pressure in the chamber 9.

The operating element 10 is an elongated valve stem member having an axial bore and extends from its integral connection with armature 7 to the valve 13 where it terminates in a valve head 14 engageable with a valve seat provided in an insert 12 threadedly carried within the flanged end of the core 3. The valve closes off inlet pressure feed from passage 15 of plate P through inlet 16 of the valve seat insert when the solenoid is energized to attract the armature 7. The valve head 14 is circumscribed by an annular channel 17 effecting a passage around a neck of the valve seat insert, connecting with radial bore 18, to effect a passage through the valve head 14 to axial bore 19 provided in the valve stem 10 communicating with pressure chamber 9. Radial throttle bore 20 communicates with channel 17 through the circumferential channel 21 of the valve seat insert, which channel communicates with outlet passage 22.

The valve stem 10 has a sliding and sealing fit at 23 within the valve seat insert which effects a bearing for the valve actuating movement and also prevents throttled flow through the passage 20 from being bypassed. As shown, bore 18 is through the valve head 14 while bore 20 is through the neck of the valve seat insert.

Armature chamber 24 communicates with channel 25, the spacing between valve stem 10 and the axial bore in core 3. Channel 25 communicates, as shown, with an axial bore 21A in a flange which demarcates the neck of the valve seat insert, which bore communicates with channel 21 and thus to outlet 22. Accordingly, armature 7 is surrounded by outlet oil and thus protected against corrosion.

The O-ring 11 additionally functions for pressure relief against the high pressure involved.

A precise spacing of the air gap S is effected by the thickness of a spacer ring 27 clamped by the threaded valve insert 12 against the bottom of the bore within the flange area of core 3. It will thus be apparent that a predetermined gap can be selected depending upon the thickness of a ring such as the ring 27.

OPERATION

Upon energization of the solenoid the armature 7 is attracted to the magnetic poles afforded by the housing and the core and the valve stem 10 is actuated to close the valve head 14 against the valve seat 12. A pump (not shown) provides feed pressure via passage 15 against the exposed end of the valve head within the inlet 16 to force it open by pressure buildup in balance against the magnetic forces effected by energization of the solenoid. The pump is then required to effect a pressure in inlet 15 to balance the solenoid electrical current. Oil under pressure flows into the channel chamber 17 and into the pressure chamber 9 through the axial bore 19 via passage 18, this being downstream of the valve seat and therefor outlet pressure. The pressure thus fed back to chamber 9 acts on valve stem 10 to exert a valve closing force. Thus, pressure within the channel 17 and in the inlet 16 is prevented from exerting a valve opening force on the valve head opposed to the strength of the energized solenoid. Accordingly, the predetermined air gap S is automatically maintained.

I claim:

1. In a solenoid operated valve assembly including an inlet (15), an outlet (22), a solenoid (1), a magnetic core (3) having opposite end faces, an armature (7) disposed adjacent to one of said end faces, an operating element (10) connected to the armature and having opposite end portions, a piston (8) connected to the operating element at one of said end portions thereof, valve means (13) including a valve seat (12) and a valve head (14) connected to the other of the end portions of the operating element and housing means (2, 5) having a pressure chamber (9), said piston being exposed to pressure in the pressure chamber exerting a valve closing force on said valve means through the operating element; said valve means being closed when said solenoid is energized thereby cutting off flow between said inlet and outlet; the improvement comprising: passage means (18, 19, 20) for establishing fluid communication between said outlet (22) and said pressure chamber (9) whereby outlet pressure in said chamber acts to close said valve means, said passage means having a bore (19) extending through said operating element, said valve head (14) being formed on said operating element at said other of the end portions thereof, said bore extending through the armature and opening directly into said pressure chamber, said magnetic core extending through said solenoid; said operating element extending axially completely through the magnetic core; said armature being disposed externally of said magnetic core adjacent said one of the end faces thereof and said valve head being disposed beyond the other of the end faces of said magnetic core.

2. In a solenoid operated valve assembly as set forth in claim 1, said magnetic core having a bore through which said operating element extends in radially spaced relation to the core to form a space (25); an armature chamber (24) enclosed by said housing means in which said armature is disposed, said armature chamber communicating with said space; means (21-21A) for establishing fluid communication between said outlet, said space and said armature chamber.

3. In a solenoid operated valve assembly including an inlet (15), an outlet (22), a solenoid (1), a magnetic core (3) having opposite end faces, an armature (7) disposed adjacent to one of said end faces, an operating element (10) connected to the armature and having opposite end portions, a piston (8) connected to the operating element at one of said end portions thereof, valve means (13) including a valve seat (12) and a valve head (14) connected to the other of the end portions of the operating element and housing means (2, 5) having a pressure chamber (9), said piston being exposed to pressure in the pressure chamber exerting a valve closing force on said valve means through the operating element; said valve means being closed when said solenoid is energized thereby cutting off flow between said inlet and outlet; the improvement comprising: passage means (18, 19, 20) for establishing fluid communication between said outlet (22) and said pressure chamber (9), whereby outlet pressure in said chamber acts to close said valve means, said passage means having a bore (19) extending through said operating element, said valve head (14) being formed on said operating element at said other of the end portions thereof, said bore extending through the armature and opening directly into said pressure chamber, said magnetic core having a bore through which said operating element extends in radially spaced relation to the core to form a space (25), an armature chamber (24) enclosed by said housing means in which said armature is disposed, said aramture chamber communicating with said space; means (21-21A) for establishing fluid communication between said outlet, said space and said armature chamber, said housing means including a casing (2) enclosing said solenoid and having an open end through which said one of the end faces of the magnetic core is exposed to said armature chamber; said open end of said casing having a surface in concentrically conical relation to said one of the end faces of the magnetic core; the armature having a complementary conical surface spaced from said casing surface and said one of the end faces of said magnetic core.

4. In a solenoid operated valve assembly including an inlet (15), an outlet (22), a solenoid (1), a magnetic core (3) having opposite end faces, an armature (7) disposed adjacent to one of said end faces, an operating element (10) connected to the armature and having opposite end portions, a piston (8) connected to the operating element at one of said end portions thereof, valve means (13) including a valve seat (12) and a valve head (14) connected to the other of the end portions of the operating element and housing means (2, 5) having a pressure chamber (9), said piston being exposed to pressure in the pressure chamber exerting a valve closing force on said valve means through the operating element; said valve means being closed when said solenoid is energized thereby cutting off flow between said inlet and outlet; the improvement comprising: passage means (18, 19, 20) for establishing fluid communication between said outlet (22) and said pressure chamber (9) whereby outlet pressure in said chamber acts to close said valve means, said passage means having a bore (19) extending through said operating element, said valve head (14) being formed on said operating element at said other of the end portions thereof, said bore extending through the armature and opening directly into said pressure chamber, waid housing means including a casing (2) enclosing said solenoid and having an open end through which said one of the end faces of the magnetic core is exposed to said armature chamber; said open end of said casing having a surface in concentrically conical relation to said one of the end faces of the magnetic core; the armature having a complementary conical surface spaced from said casing surface and said one of the end faces of said magnetic core.

5. In a solenoid operated valve assembly as set forth in claim 4, said housing means further comprising a cover (5) secured to said casing and enclosing said pressure chamber, gasket means (11) positioned by the cover in said pressure chamber for guiding movement of said piston therein; the other of the opposite end portions of said operating element passing through the valve seat which forms a bearing therefor.

* * * * *